July 31, 1962 G. ANGST ET AL 3,047,755
SYNCHRONOUS RELUCTANCE ROTOR
Filed Jan. 15, 1960 2 Sheets-Sheet 1
FIG. 1
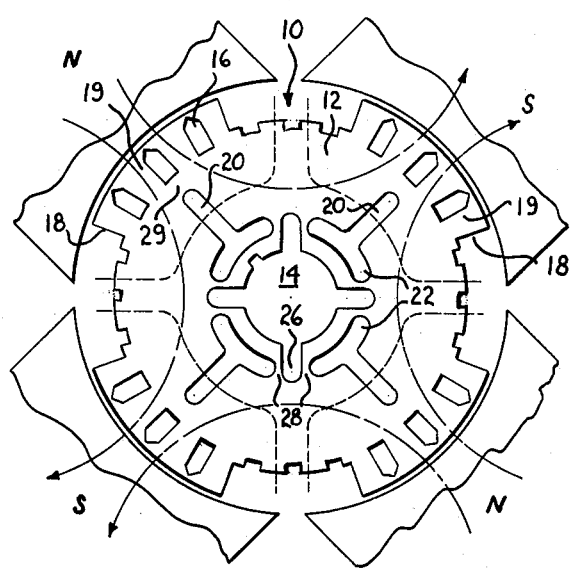
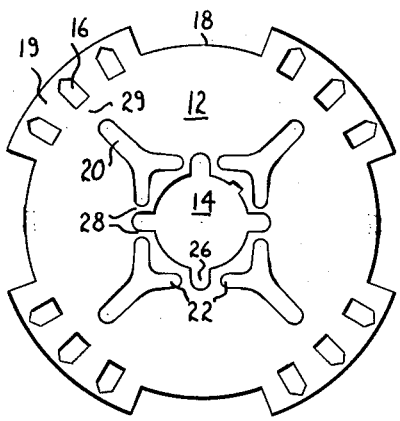
FIG. 2
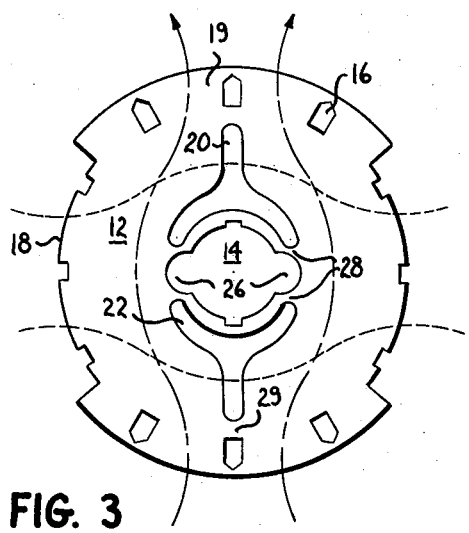
FIG. 3
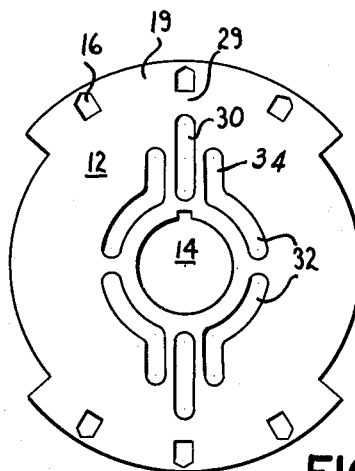
FIG. 4
INVENTORS
GUSTAVE ANGST
ALAN F. LUKENS
BY James R. Campbell
ATTORNEY

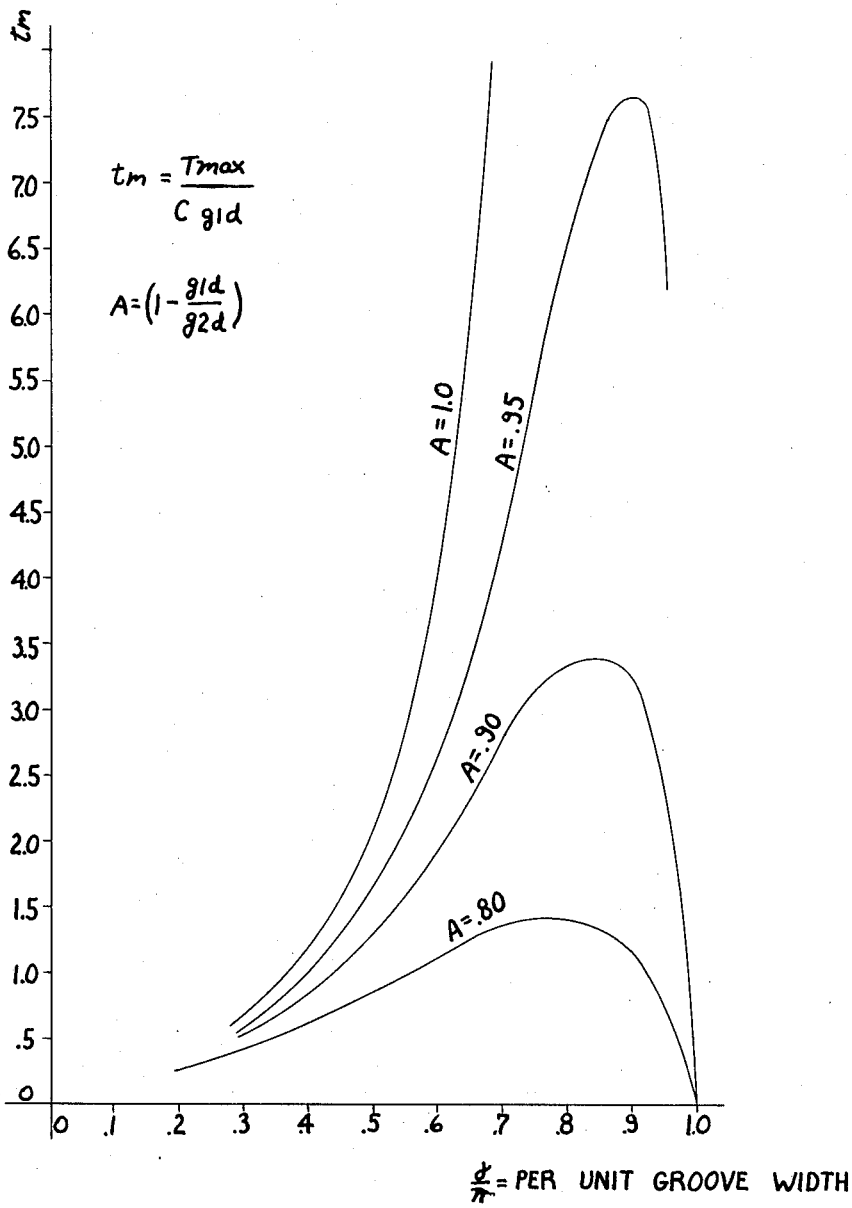
FIG. 5 — PULL-OUT TORQUE AS FUNCTION AS GROOVE WIDTH

United States Patent Office 3,047,755
Patented July 31, 1962

3,047,755
SYNCHRONOUS RELUCTANCE ROTOR
Gustave Angst and Alan F. Lukens, Schenectady, N.Y.,
assignors to General Electric Company, a corporation
of New York
Filed Jan. 15, 1960, Ser. No. 2,765
9 Claims. (Cl. 310—162)

The invention described herein relates to synchronous reluctance motors and more particularly to an improved design of rotor which permits economy in manufacture and displays high quality performance during operation.

The basic design for modern synchronous induction motors is disclosed in Morrill et al. Patent 1,915,069 which teaches shaping the outer surface of a rotor to provide axially extending grooves spaced circumferentially around the rotor to form salient poles therebetween. Squirrel cage bars positioned in the rotor surface and the salient poles formed by this kind of design eliminate starting problems associated with locking and crawling which were prevalent in the prior art. Also, the patent discloses the use of radially extending slots in these rotor poles for increasing the holding torque at synchronous speeds. The slots place a high reluctance in the path of the quadrature flux while establishing a low reluctance path for the direct axis flux which has proven effective in markedly increasing the output torque of synchronous induction motors. The primary disadvantage of this design however is that a non-magnetic sleeve or shaft must be used to cause the quadrature flux to follow the desired path in the rotor. In the preferred form disclosed in the patent, the axial grooves are shaped with smooth rounded surfaces thus requiring special dies for punching out the laminations. An important advantage of this construction, as well as others, is that complete laminations can then be assembled on a shaft in a single operation for forming the rotor core.

Alternative designs have been suggested wherein the rotor core is divided into circumferentially spaced quadrantal sections, each section comprising a plurality of thin laminated segments which are assembled around a shaft and held against displacement by bolts which extend transversely and at right angles through the core. This supporting arrangement is supplemented by an aluminum winding which is cast in the various axial openings provided in the several sections forming the rotor core. This type of design also envisions the use of radially extending slots and axially extending grooves to form the salient poles and furnish a high reluctance path to the flow of quadrature flux in the motor. As in the Morrill et al. patent, a non-magnetic sleeve also is needed around the shaft for confining the flux to the desired flow paths in the rotor.

To eliminate disadvantages inherent in the segmented construction, two of the four segments have been joined to form a single segment which provides a mechanically stronger and more economical method of manufacturing the rotor. Nevertheless segmented rotors are very expensive to manufacture because of the labor costs represented by time required to punch out and assemble the separate segments for forming the rotor core. An expensive non-magnetic sleeve or shaft is required to confine the flux to the desired flow path, and while this is eliminated in the latter construction, the two remaining unconnected segments still present construction problems.

In both designs, the magnetic circuit is acceptable but the rotor is mechanically weak because the segments are held together only by the cast bars and end rings, in addition to that support provided by the transversely extending bolts. Weakness in the structure results from the fact that aluminum loses its strength considerably below the melting point, and after the machine is placed in operation and the parts become heated, distortion of the cast aluminum winding and the end rings may occur when subjected to centrifugal forces. Accordingly, this fact places an upper limit on the speed of rotation because of the centrifugal forces involved. Another important drawback is that as the number of poles are increased in these prior art designs, the number of segments correspondingly increase so that both the manufacturing costs and the problems associated with the magnetic circuits rise considerably.

In view of the above it is evident that the magnetic circuits provided in rotors of this type are acceptable but the manufacturing costs are so high that improvements in this area need to be effected.

Accordingly, the primary object of our invention therefore is to provide an inexpensive rotor made of complete laminations and capable of providing a high reluctance path to the quadrature flux without requiring the use of a non-magnetic shaft or sleeve while still furnishing the mechanical strength necessary to withstand the effects of centrifugal forces.

In carrying out our invention in one form, we utilize a plurality of complete laminations which when stacked together form the rotor core. Each lamination is equipped with a central bore and a series of spaced radially extending narrow slots located in alignment with the center of salient poles through which the direct axis flux flows. Concentric slots coacting with the narrow slots are positioned in substantially concentric relationship with the bore and thus coact with the radial dividing slots to furnish the necessary high reluctance path for quadrature flux. The arrangement of the slot openings produces a high reluctance barrier to the flow of quadrature flux which is required to follow a predetermined path in the rotor. This results in a wide spread between the direct and quadrature axis synchronous reactances thereby causing the motor to produce high torque during operation. Axial grooves of conventional design are located in the interpole space and extend the rotor length and are chosen to furnish the largest possible cross section in the axis of the grooves consistent with both the desired electrical characteristics and mechanical strength.

While the specification concludes with claims particularly pointing out and distinctly claiming the subject matter which we regard as our invention, it is believed the invention will be better understood from the following description taken in connection with the accompanying drawing in which:

FIGURE 1 is a view in elevation taken on a transverse line through a motor to show the disposition of the various slot openings and the flux paths;

FIGURE 2 is a view in elevation of a modification showing variations in the slot configurations used for creating high reluctance paths to the flow of quadrature axis flux;

FIGURE 3 is a modification illustrating a design for use in two-pole motors;

FIGURE 4 is still another modification showing variation in punching design; and FIGURE 5 shows curves plotting pull out torque against groove width.

The rotor shown has a shaft adapted for mounting in the core in a conventional manner, but to clearly show the distribution of flux between the primary and secondary windings, the poles produced by the primary are shown rather than the winding itself. The secondary is illustrated without a winding in the slots but a complete rotor will include either a cast or fabricated winding and be equipped with end rings, with or without fan blades, of the type usually found in squirrel cage induction motors.

Referring now to the drawings wherein like reference characters designate like or corresponding parts throughout the several views, there is shown in FIGURE 1, a rotor core 10 comprising a plurality of stacked laminations 12 having a central core 14 and squirrel cage slots 16 disposed around the complete periphery of the punching. Because of the rotor locking tendencies of synchronous induction machines at starting, the squirrel cage winding is employed for facilitating starting as is well known in the art. The rotor surface of each lamination 10 is equipped with axially extending grooves 18 which form salient poles 19 therebetween. The grooves may be punched in the lamination or they may be formed by machining out this section after the rotor has been completely assembled. When conventional squirrel cage laminations are used, a portion of the bars in the slots may be cut away while forming the groove. Such partial bars however may be omitted if desired. FIGURES 1 and 3 show partially cut bars at the grooves while FIGURES 2 and 4 omit the slots and bars at the grooves.

To obtain full utilization of the torque characteristics of the motor after it is in operation, the design should provide for maximum reluctance in the quadrature axis while maintaining the direct axis reluctance at its minimum and thereby permit maximum pull-out torque. This condition is achieved by reducing the quadrature axis flux to a minimum and is accomplished in our construction by positioning radially extending slots 20 in each lamination which extend a substantial portion of each pole length so as to effectively divide each pole at its center. Slots 20 merge into arcuate shaped slot portions 22 which are concentric with the lamination bore and encompass a major part of the lamination in this area. These slots may be cast with aluminum or other metal if one desires, but machine performance at operating speed is not altered if they are left void.

In order to utilize a relatively inexpensive magnetic shaft, as compared to non-magnetic materials, it is necessary to provide as high a reluctance around the shaft as is possible. We accomplish this by punching radially extending slot openings 26 in each lamination which communicate with the bore at one end, and have their outer ends terminating at a point lying equidistant between adjacent slot portions 22. This construction leaves a very small but mechanically strong bridge 28 between slot openings 22 and 26 which by virtue of its small size, saturates very quickly, and thus becomes a path of high reluctance in parallel with the high reluctance slots 22 and 26. The quadrature axis flux is thereby almost completely prevented from penetrating the barrier around the shaft and thus permits making the latter of magnetic material. A narrow bridge 29 is also provided between the radial slot 20 and the winding slot 16 directly above it. This bridge saturates like the other bridges and therefore contributes to restricting the quadrature axis flux. In an alternate construction, the radial slot 20 may be separated from slot portions 22 by a narrow bridge which saturates and forms also a high reluctance path for the quadrature axis flux.

The dot-dash lines of FIGURE 1 show the path of direct axis flux and although slots 20 lie in the path of the flux, machine performance is not adversely affected because the cross sectional area of each pole is of sufficient size to easily handle the maximum flux available without saturating. The direct axis reluctance therefore remains lows.

Considering the flow path of the quadrature axis flux whose path is shown by dotted lines in FIGURE 1, it will be seen that it is required to bridge the gap or slot 20 and 22 which is employed for providing a very high reluctance to flux flow. As a result, the spread between the direct and quadrature axis reactance is very high thus increasing the maximum pull-out torque of the motor. The advantage gained is that a magnetic shaft may be used and yet the quadrature axis flux is reduced to a minimum.

It will be apparent that the selection of the width of bridge 28 between openings 22 and 26 and the width of bridge 29, if any, which will furnish a certain value of reluctance, must be consistent with the degree of mechanical strength needed in the lamination. The necessity for employing a special non-magnetic sleeve or shaft as is required in the prior art devices using segmented laminations, is now eliminated. The concept of having pole sections formed in a single lamination provides radial struts which can withstand any centrifugal forces expected to be encountered, and also leaves sufficient matereial around the shaft for a practicable shaft fit. Also, the rotor winding can be cast and machined or fabricated in standard squirrel cage induction motor facilities. The reluctance slots may or may not be filled with conducting material.

Referring now to FIGURE 2, the construction shown is substantially the same as that for FIGURE 1 except that the arcuate portions 22 of slot 20 are shaped to the configuration of a Y rather than a T as shown previously. This arrangement also establishes a very high reluctance around the shaft and of a value sufficient to divert the quadrature axis flux in the same direction as the flux path indicated by dotted lines in FIGURE 1. The bridge 28 quickly saturates so that the reluctance provided in this area, when combined with the high reluctance of the slots, is sufficient to obtain quadrature flux flow in the manner previously described.

This invention, while applicable to rotors of any number of poles, lends itself particularly to two pole rotors of the type shown in FIGURE 3. It will be seen that the radial slots 20 are located in the same position in the lamination as in previous modifications. The arcuate openings 22 however are extended a greater distance in order to encompass a larger portion in a circumferential direction. The openings 26 which lead into the bore likewise are the same as that previously described. This arrangement of openings in the lamination establishes a barrier around the shaft having reluctance equivalent to that found in the four pole designs. The bridges 28 and 29 are of corresponding width and saturate to the same degree as those previously described. The direct and quadrature axis fluxes respectively are indicated by the dot-dash and dotted lines in FIGURE 3. This construction permits the use of single laminations where the prior art needed separate segments. Also, a magnetic shaft may be used in this design as in the others.

FIGURE 4 is still another modification that may be used to permit the use of integrally formed laminations and a magnetic shaft for decreasing the cost required in manufacturing this type of rotor. As shown, in lieu of using T or Y-shaped openings around the shaft, an arrangement may be employed wherein the radially extending slots 30 are the equivalent to slots 20 illustrated in FIGURE 1. The shaft is encompassed by arcuate-shaped members 32 having radially projecting ends 34 which lie in a line parallel with the radial slot 30. The amount of material between the slots 30 and 34 and slots 32 is chosen to be of thickness sufficient to provide the desired mechanical strength in the punching. It will be evident that these very small areas between adjacent slots will saturate rapidly as will the areas 29 and when combined with the slot portions will provide a high reluctance barrier around the shaft on which the lamination would be mounted. Many configurations of slot design may be used for accomplishing the objectives mentioned above. For example, the ends of slots 22 may be directed outwardly in a line generally parallel with opening 26 to provide a stronger punching, but still provide a bridge that will quickly saturate. This modified design then would be similar to that shown in FIGURE 4 where the slots 30 and 34 are generally parallel.

Although the above construction provides for economy in manufacture, we have found that the performance may be improved substantially by increasing the width of grooves 18 beyond previously known values. The following discussion shows that variation in slot width over that taught by the prior art directly benefits the pull-out torque characteristics of the motor.

Pull-out torque is given approximately by the expression (1) $$T_{PO} = KV^2 \left[ \frac{1}{X_q} - \frac{1}{X_d} \right]$$

$X_d$ and $X_q$ are synchronous reactances which are approximately inversely proportional to the corresponding reluctances. From this equation it is apparent that making the quadrature axis synchronous reactance ($X_q$) as small as possible while keeping the direct axis synchronous reactance ($X_d$) large relative to $X_q$ will result in an increase in pull-out torque ($T_{PO}$). There are several ways of doing this, some better than others depending on the effect on other performance characteristics such as efficiency, power factor and heating. Three parameters which have direct effects on pull-out torque are flux, groove width 18 and quadrature axis reluctance as determined by groove depth, width of deep slot 20 and width of arcuate openings 22 and 26.

Increasing flux increases $T_{PO}$ but it also decreases $X_d$ and power factor and increases core loss. Eventually the salient poles 19 become too highly saturated and overall performance becomes poor. While it is desirable to increase the flux density of the salient poles up to a point, increasing flux also increases yoke density which has a detrimental effect on efficiency.

Increasing quadrature axis reluctance decreases $X_q$ and hence increases $T_{PO}$. Decrease of $X_q$ has little effect on $X_d$ and, besides increasing $T_{PO}$, results in better overall performance. The construction described above effectively accomplishes such improved performance by utilizing the particular arrangement of openings in the laminations to provide the desired values of high reluctance. Selection of bridges small enough to permit saturation also establishes an effective barrier to the quadrature axis flux.

Increasing the groove width also increases the pull-out torque ($T_{PO}$) but there are limitations on maximum widths that may be used. An increase in the width of grooves 18 also increases the pole flux density but has no effect on the yoke density and the core loss therefore does not increase as much as it would for a proportionate increase in total flux. Conventional designs utilize a groove width equal to about 50% of the pole pitch. In our proposed constructions, although the 50% values may be used, we have found that increasing the width to values in excess of 55% of the pole pitch provides better pull-out torque characteristics. It will be understood that the optimum value for groove width also depends on other motor parameters such as effective air gap lengths and the width of the radially extending slots in the poles and the width of arcuate slots near the shaft. The effect of such other parameters and groove widths on pull-out torque is shown in the curves of FIGURE 5 in which for the purpose of clarity the effects of the widths of the radial slots 20 and arcuate slots 22 has been omitted. These curves relate pull-out torque to groove width and effective gap lengths $g_{1d}$ and $g_{2d}$.

When the expressions for $X_d$ and $X_q$ are substituted in Equation 1 the approximate expression for pull-out torque is as follows, assuming that armature resistance and leakage reactance are neglected since their effect is small.

(2) $$T \max \propto V^2 \frac{\left\{ \frac{\sin \gamma}{\pi} \left(1 - \frac{g_{1d}}{g_{2d}}\right) \right\} g_{1d}}{\left\{1 - \frac{\gamma}{\pi}\left(1 - \frac{g_{1d}}{g_{2d}}\right)\right\}^2 - \left\{\frac{\sin \gamma}{\pi}\left(1 - \frac{g_{1d}}{g_{2d}}\right)\right\}^2}$$

where:
$g_{1d}$ = effective gap under poles
$g_{2d}$ = effective gap in grooves
$\gamma$ = width of grooves in electrical radians This expression shows that the pull-out torque depends on three factor, namely the width of the grooves $\gamma$, the ratio $$\left(\frac{g_{1d}}{g_{2d}}\right)$$

and the effective gap under the poles $g_{1d}$.

For constant values of $\gamma$ and $$\left(\frac{g_{1d}}{g_{2d}}\right)$$

the optimum value of pull-out torque is obtained if the effective gap $g_{1d}$ is made as large as possible. The value of $g_{1d}$ is limited first by the fact that, in order to keep $$\left(\frac{g_{1d}}{g_{2d}}\right)$$

constant, the grooves have to be made correspondingly deeper, and secondly by the heating of the motor. The larger $g_{1d}$, other things being equal, the higher the current, and, therefore, the armature copper loss. It must also be kept in mind that, due to the high saturation in the armature and secondary teeth, the value of $g_{1d}$ is already considerably higher than the actual gap $g_1$. On the other hand $g_{2d}$ is little affected by saturation.

If ($g_{1d}$) and the ratio $$\left(\frac{g_{1d}}{g_{2d}}\right)$$

are assumed to be kept constant and the groove width $\gamma$ is varied, the effect on the pull-out torque is shown in FIGURE 5. Each curve represents a different constant value of $$A = \left(1 - \frac{g_{1d}}{g_{2d}}\right)$$

while ($g_{1d}$) is assumed to be equal to 1.0 for all curves.

It will be seen from these curves, that the per unit width of the grooves should be made rather large, up to about .8 instead of .5 formerly used, in order to obtain optimum pull-out torque. However, it should be kept in mind that, as the width of the grooves is increased, other things being equal, the saturation in the teeth under the poles increases very rapidy, which increases the value of ($g_{1d}$) and reduces the factor $$A = \left(1 - \frac{g_{1d}}{g_{2d}}\right)$$

The former tends to increase the pull-out torque while the latter will decrease it. The net effect causes the curves to reach their maximum at lower values of $$\left(\frac{\gamma}{\pi}\right)$$

and the actual maximum value of torque will be slightly less than the curves indicate.

In view of the above, it will be apparent that the use of groove widths greater than 55% of the pole pitch, will provide desirable pull-out torque characteristics in a reluctance synchronous motor where the prior art has taught maximum groove widths should be about 45%–55% of the pole pitch. The increase in pull-out torque thus achieved is substantial and is beyond that heretofore considered feasible by motor designers.

It will be obvious that many modifications and variations are possible in light of the above teachings. For example, the special designs of laminations shown are intended to be representative of those which may be used to obtain economy in manufacture. Since our objectives are to obtain economy in manufacture by providing integrally formed laminations having high reluctance characteristics, to permit use of a magnetic shaft, and to use groove widths greater than that taught by the prior art, it will be evident that he specific consructions shown and described are representative of those which may be used for carrying out the same functions. It therefore is to be understood that within the scope of the appended claims the invention may be practiced otherwise than as specifically described.

What we claim as new and desire to secure by Letters Patent of the United States is:

1. A synchronous reluctance motor comprising a rotor and a stator, said rotor comprising a plurality of stacked one-piece laminations having a central bore and a magnetic shaft therein, a series of axial grooves in the rotor surface forming salient poles therebetween, radial slots lying on the central axis of the poles for providing a high reluctance path to the flow of quadrature flux in the rotor but permitting unimpeded flow of the direct axis flux therein, curved slots formed in the stacked laminations and positioned at circumferentially spaced intervals around the bore for establishing a high reluctance barrier to the flow of quadrature axis flux into the bore thereby permitting use of a magnetic shaft for supporting the rotor laminations, and a winding in the rotor.

2. The combination according to claim 1 wherein the axial groove width varies between 55% and 80% of the pole pitch.

3. The combination according to claim 1 wherein the axial groove width varies between 60% to 80% of the pole pitch.

4. The combination according to claim 1 wherein the axial groove width varies between 65% to 80% of the pole pitch.

5. A synchronous reluctance motor comprising a rotor and a stator, said rotor comprising a plurality of laminations assembled to form the rotor core and having a central bore therein, axial grooves extending the length of the rotor and being equal in number to the number of poles desired in the rotor, radial extending slots on the central axis of each pole coacting with slots substantially concentric with the rotor bore, squirrel cage slots in said rotor, and a winding in said squirrel cage slots, said radial and concentric slots being arranged to provide a high reluctance barrier in the laminations around the bore for essentially preventing the flow of flux into a magnetic shaft adapted for supporting the rotor, said slots further being effective in minimizing the flow of quadrature axis flux around the radial slots provided in each pole, thereby increasing the spread between the direct and quadrature axis synchronous reactances for increasing the pull-out torque of the motor.

6. A synchronous reluctance motor comprising a rotor and a stator, said rotor comprising a plurality of one-piece laminations stacked together to form the rotor core, a central bore in said core and axially extending grooves in the outer peripheral surface having a width sufficient to provide salient poles in the rotor, at least a portion of a squirrel cage winding in slots near the rotor surface, radial slots positioned in the central axis of each pole and extending throughout the length of the rotor, arcuately shaped slots positioned substantially concentric with the rotor bore, and radially extending openings punched in each of the aligned laminations, said openings having their outermost ends terminating at a point equidistant between the adjacent arcuate slots for cooperating therewith and providing a high reluctance barrier to the flow of flux into the rotor bore, a magnetic shaft in the bore, the reluctance of said slots and openings being such that the quadrature axis flux is reduced to a minimum.

7. The combination according to claim 6 wherein each radial extending slot divides at its innermost end into a pair of outwardly directed slot portions which extend in opposite directions and encompass a portion of the rotor bore.

8. The combination according to claim 6 wherein the radially and arcuately extending slots are of substantially T-shaped configuration.

9. The combination according to claim 6 wherein the radially and arcuately extending slots are of substantially Y-shaped configuration.

References Cited in the file of this patent

UNITED STATES PATENTS

| | | |
|---|---|---|
| 2,072,894 | Lilja | Mar. 9, 1937 |
| 2,483,848 | Saratzky | Oct. 4, 1949 |
| 2,733,362 | Bauer et al. | Jan. 31, 1956 |
| 2,913,607 | Douglas et al. | Nov. 17, 1959 |